Nov. 16, 1965   J. HAUXWELL ETAL   3,217,492
CONTROL APPARATUS FOR CONTROLLING OPERATION OF
A PLURALITY OF FLUID PRESSURE OPERATED RAMS
Filed June 25, 1963   5 Sheets-Sheet 1

Inventors
Jack Hauxwell
Cyril William Blacker

Nov. 16, 1965   J. HAUXWELL ETAL   3,217,492
CONTROL APPARATUS FOR CONTROLLING OPERATION OF
A PLURALITY OF FLUID PRESSURE OPERATED RAMS
Filed June 25, 1963   5 Sheets-Sheet 4

Jack Hauxwell
Cyril Wilham Blacker

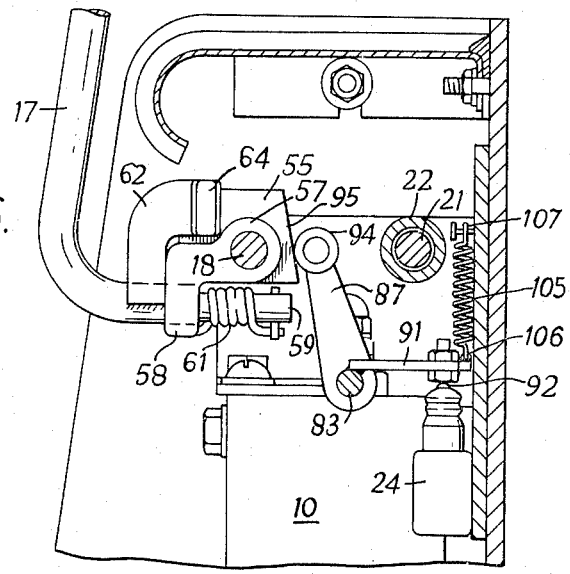
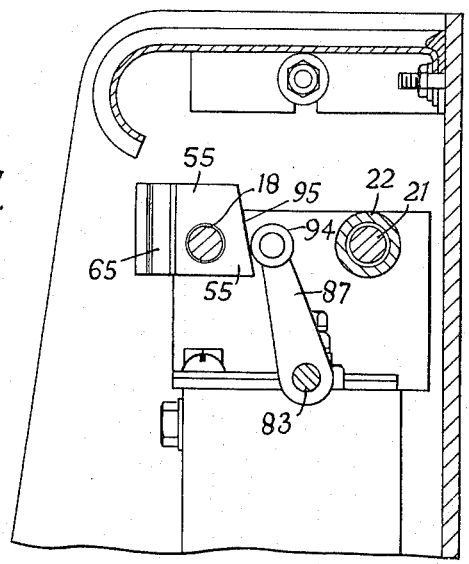

3,217,492
CONTROL APPARATUS FOR CONTROLLING OPERATION OF A PLURALITY OF FLUID PRESSURE OPERATED RAMS
Jack Hauxwell and Cyril William Blacker, Ipswich, England, assignors to Ransomes Sims & Jefferies Limited, Ipswich, England
Filed June 25, 1963, Ser. No. 290,478
Claims priority, application Great Britain, June 26, 1962, 24,515/62
7 Claims. (Cl. 60—52)

This invention relates to apparatus for controlling operation of a plurality of fluid pressure operated units, for example, hydraulic rams.

The invention is particularly applicable to vehicles for manipulating and transporting goods or material. In, for example, a masted fork lift truck control apparatus is required for controlling the operation of a plurality of rams which in turn respectively effect movement of the fork bearing carriage on the mast and change in the angle of inclination of the mast. Suitably, the rams, which vary the mast inclination are double acting whereas the ram which controls the carriage on the mast is single acting. The apparatus may also be required to control operation of further rams which effect movement of other devices on the truck.

According to the invention there is provided control apparatus for controlling the operation of a plurality of fluid pressure operated units, for example, hydraulic rams, said apparatus comprising a lever movable to a plurality of different operative positions, two fluid valves independently movable by the lever into different operative settings, each valve setting being dependent upon the selected operative position of the lever, and a switch actuated in a plurality of the operative positions of the lever to effect starting of a fluid pressure pump motor which supplies pressure fluid to the fluid operated units connected to the pump by way of the fluid valves.

Suitably, in one operative position of the lever the switch is inoperative and the fluid valves in this position of the lever are set to permit venting of pressure fluid from a ram or rams to a low pressure region namely, atmosphere in the case of gaseous pressure fluid or a liquid reservoir in the case of liquid pressure fluid.

Each fluid valve preferably has a rotary operating shaft which is angularly movable to set the valve in different operative settings, one of the shafts comprising a tube and the other shaft comprising a rod extending through the tube and rotatably mounted therein. The lever may then be mounted on one of the shafts for angular movement thereon, and first and second clutch means on opposite sides of the lever may be arranged selectively to clutch the lever to each of the two valve operating shafts.

Control apparatus according to the invention and arranged to control hydraulically operated rams in a fork lift truck, will now be described by way of example with reference to the accompanying drawings, in which:

FIGURES 4, 5, 6 and 7 are views on the lines IV—IV, V—V, VI—VI, VII—VII in FIGURE 1 respectively, showing details of the construction of the apparatus.

Figure 1:
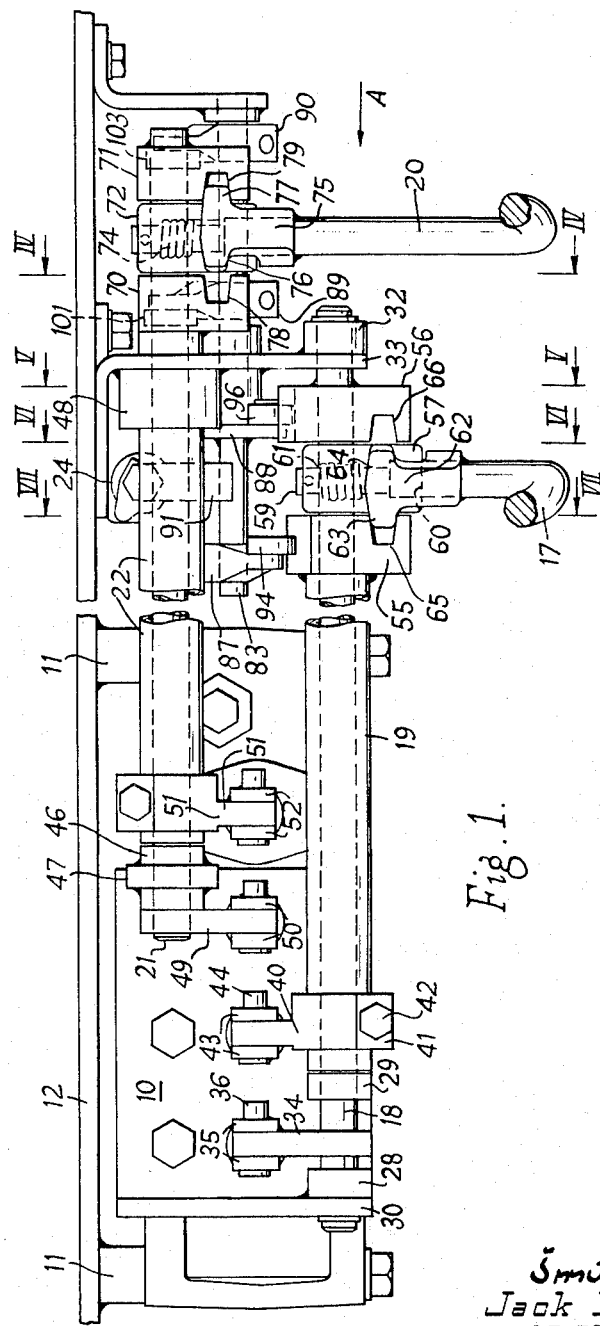
FIGURE 1 is a plan view of the apparatus mounted on the rear of the front cowling of the truck.

Referring to the drawings, the control apparatus comprises a valve block 10 bolted on brackets 11 on the rear of the front cowling 12 of the truck, the block 10 having four vertical valve spools 13, 14, 15, 16 arranged along a transverse centre line of the valve block and each movable axially between a central "hold" setting and upper and lower operative settings, a control lever 17 adapted to be clutched selectively to one or other of operating shafts 18, 19 for the valve spools 13, 14, a control lever 20 adapted to be clutched selectively to one or other of operating shafts 21, 22 for the valve spools 15, 16, and a switch mechanism 23 arranged to close a micro-switch 24 in response to angular movement of the valve operating shafts 18, 19, 21, 22.

The valve operating shaft 18 is a circular section rod having one end rotatably mounted in spaced apart bearings 28, 29 supported on a bracket 30 secured on the valve block 10, and its other end rotatably mounted in a bearing 32 supported on a bracket 33 secured on the front cowling 12. The shaft 18 is positioned to the rear of the transverse centre line of valve block 10 and is coupled to the valve spool 13 by a rocker arm 34 secured at one end to the shaft 18 between the two bearings 28, 29, and by two depending links 35 the upper ends of which are pivotally mounted on a pin 36 secured in the free end of the rocker arm 34 and the lower ends of which are pivotally mounted on a pin 37 secured in the upper end of the valve spool 13. Angular movement of the shaft 18 in a clockwise direction, as viewed in the direction of arrow A in FIGURE 1, will rock the arm 34 downwards and thereby lower the valve spool 13, while movement of the shaft 18 in an anti-clockwise direction will rock the arm 34 upwards and raise the valve spool 13.

The valve operating shaft 19 is a tube which surrounds and is rotatably mounted on the shaft 18, the ends of the shaft 18 projecting beyond the ends of the tubular shaft 19. A rocker arm 40 has a split shell portion 41 at one end which surrounds the shaft 19 and is clamped thereon by a bolt 42. The rocker arm 40 is coupled to the valve spool 14 by two depending links 43, the upper ends of which are pivotally mounted on a pin 44 secured in the free end of the rocker arm 40 and the lower ends of which are pivotally mounted on a pin 45 secured in the upper end of valve spool 14. Angular movement of the tubular shaft 19 in a clockwise direction as viewed in the direction of arrow A in FIGURE 1, will lower the valve spool 14 and angular movement in an anti-clockwise direction will raise the valve spool 14.

The valve operating shafts 21, 22 are similar in construction and arrangement to the shafts 18, 19. The shaft 21 is a circular section rod, and the shaft 22 is a tube which surrounds the shaft 21, the shaft 21 projecting beyond the ends of the tubular shaft 22. The shafts 21, 22 are positioned to the front of the transverse centre line of the valve block 10 and are arranged parallel to the shafts 18, 19 but displaced to the right with respect to these latter shafts, as viewed in FIGURE 1. One end of the shaft 21 is rotatably mounted in a bearing 46 secured in a bracket 47 on the valve block 10, and the end portion of the shaft 22 remote from the valve block is rotatably mounted in a bearing 48 secured on the bracket 33, the two bearings 46, 48 supporting the assembly of the two shafts 21, 22. The shaft 21 is coupled to the valve spool 15 by a rocker arm 49 and links 50 similar in construction to the rocker arm 34 and links 35 already described, and the shaft 22 is coupled to the valve spool 16 by a rocker arm 51 and links 52 similar in construction to the rocker arm 40 and links 43. Since however the shafts 21, 22 are positioned in front of the valve spools 15, 16, the rocker arms 49, 51 project rearwardly. Angular movement of the shafts 21, 22 in a clockwise direction, as viewed in the direction of arrow A in FIGURE 1, will thus raise the valve spools 15, 16 and movement in an anti-clockwise direction will lower the spools 15, 16.

A rectangular collar 55 is secured on the end of the tubular shaft 19 remote from the valve block 10, and a rectangular collar 56 is secured on the adjacent end of the shaft 18. The collars 55, 56 are spaced apart and a saddle 57 for the support of the control lever 17 is rotatably mounted on the shaft 18 between the two collars 55, 56. The saddle 57 has an L-shaped lug 58 which extends rearwardly and downwardly, and the downwardly projecting arm of the lug has a bore which extends normal to the bore in the saddle for the passage of the shaft 18. The lower end of the control level 17 has a reduced diameter part 59 which projects forwardly through the bore in the lug 58 and is a close rotational fit within the bore. The shoulder 60 at the rear of the part 59 of the lever 17 is urged against the lug 58 by a coil spring 61 surrounding the part 59, one end of the spring 61 being anchored in a transverse aperture in the part 59 and the other end of the spring 61 being anchored in an aperture in the lug 58. The spring 61 is also stressed torsionally on assembly on the part 59 of the lever 17 so as to bias the lever in an anti-clockwise direction as viewed in FIGURE 2.

The lower end of the lever 17 to the rear of the lug 58 is fitted with a dog 62 having two teeth 63, 64 on opposite sides of the lever. The tooth 63 is adapted to engage in a recess 65 in the adjacent side wall of the collar 55, upon angular movement of the lever towards the collar 55, and the tooth 64 is adapted to engage in a recess 66 in the adjacent side wall of the collar 56, upon angular movement of the lever towards the collar 56. The teeth 63, 64 are of a length such that each tooth is clear of its adjacent collar when the other tooth is fully engaged within its associated recess. The coil spring 61 biases the lever 17 in a direction to engage the tooth 63 in the recess 65.

A rectangular collar 70 is secured on the end of the tubular shaft 22 remote from the valve block 10, and a rectangular collar 71 is secured on the adjacent end of the shaft 21. The collars 70, 71 are spaced apart and a saddle 72 for the support of the control lever 20 is rotatably mounted on the shaft 21 between the two collars 70, 71. The saddle 72 is similar in construction and arrangement to the saddle 57, and the lever 20 is pivotally mounted on a lug 73 on the saddle 72 and held in position by a coil spring 74 in a similar manner to the arrangement of lever 17 on the saddle 57 already described. The coil spring 74 is however arranged to bias the lever 20 in a clockwise direction, as viewed in FIGURE 2.

The lower end of the lever 20 to the rear of the lug 73 is fitted with a dog 75 having two teeth 76, 77 on opposite sides of the lever. The tooth 76 is adapted to engage in a recess 78 in the adjacent side wall of the collar 70, upon angular movement of the lever towards the collar 70, and the tooth 77 is adapted to engage in a recess 79 in the adjacent side wall of the collar 71, upon angular movement of the lever towards the collar 71. The coil spring 74 biases the lever 20 in a direction to engage the tooth 77 in the recess 79.

The switch mechanism 23 comprises a shaft 83 arranged parallel to the valve operating shafts 18, 19, 21, 22 but positioned symmetrically below the latter shafts. The shaft 83 is rotatably mounted in a bearing 84 supported on bracket 33 and in a further bearing 85 supported on a bracket 86 on the front cowling 12. Four rocker arms 87, 88, 89, 90 are secured on the shaft 83 opposite the collars 55, 56, 70, 71 respectively, and an arm 91 on the shaft 83 projects forwardly above an operating plunger 92 of the micro-switch 24 which is mounted on the front cowling 12. As shown in FIGURE 2, the rocker arm 88 can conveniently be welded at one end on to the shaft 83 and the rocker arms 87, 89, 90 formed with bifurcated ends which embrace the shaft 83 and are adjustably secured thereon by clamping bolts. Angular movement of the shaft 83 in the clockwise direction, as viewed in the direction of arrow A in FIGURE 1, will thus pivot the arm 91 downwards into contact with the operating plunger 92 and thereby close the micro-switch 24.

Figure 5:
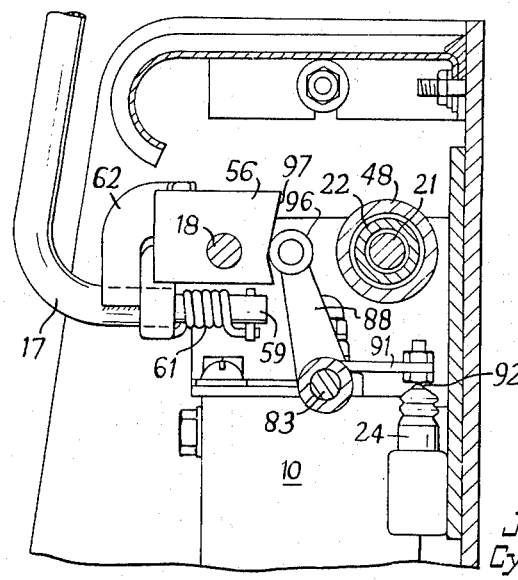

The free end of the rocker arm 87 is provided with a roller 94 which engages a cam surface 95 on the front face of the collar 55, the axis of the roller 94 being level with the centre of the collar 55, and the free end of the rocker arm 88 is provided with a roller 96 which engages a cam surface 97 on the front face of the collar 56, the axis of the roller 96 being level with the centre of the collar 56. The cam surface 97 has a profile in the form of a shallow V (see FIGURE 5), the apex of which is at the level of the centre of the collar 56 when the operating shaft 18 and valve spool 13 are in a central position. Angular movement of the shaft 18 and collar 56 in either direction from the central position will thus cause angular movement of the rocker arm 88 and shaft 83 in a clockwise direction as viewed in the direction of arrow A in FIGURE 1 to close the micro-switch 24. The cam surface 95 (FIGURE 7) has however a profile which is straight and inclined forwardly and downwardly. Angular movement of the shaft 19 and collar 55 in an anti-clockwise direction from a central position, as viewed in the direction of arrow A in FIGURE 1, will thus cause angular movement of the rocker arm 87 and shaft 83 in a clockwise direction to close the micro-switch 24, but angular movement of the shaft 19 and collar 55 in a clockwise direction will not result in any movement of the rocker arm 87 or shaft 83. The micro-switch 24 will then remain open.

Figure 3:
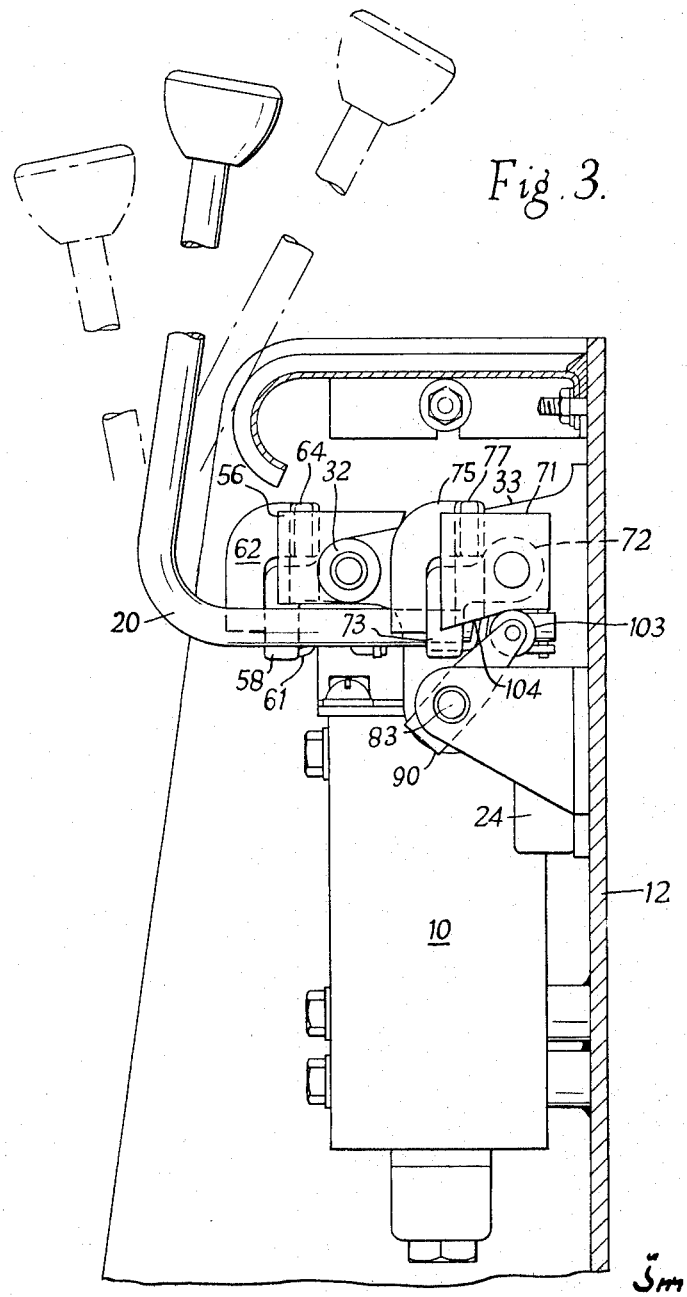
FIGURE 3 is an end elevation view of the apparatus of FIGURES 1 and 2, viewed in the direction of the arrow A.
Figure 4:
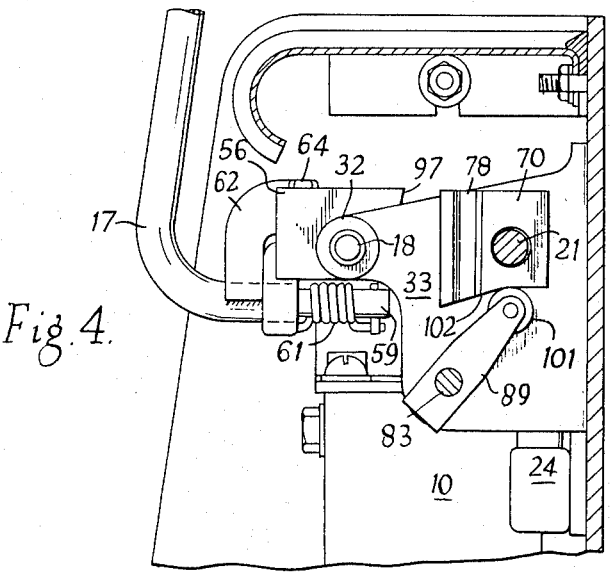

The free end of the rocker arm 89 is provided with a roller 101 which engages a cam surface 102 on the bottom face of the collar 70, the axis of the roller 101 being directly below the centre of the collar 70, and the free end of the rocker arm 90 is provided with a roller 103 which engages a cam surface 104 on the bottom face of the collar 71. Both the cam surfaces 102 and 104 (FIGURES 4 and 3) have a profile, the front part of which is horizontal and the rear part of which is inclined downwards and rearwards when the valve operating shafts 21, 22 and valve spools 15, 16 are in a central position. Angular movement of the shaft 22 and collar 70 in either direction from the central position will thus cause angular movement of the rocker arm 89 and shaft 83 in a clockwise direction, as viewed in the direction of arrow A, to close the micro-switch 24. Similarly, angular movement of the shaft 21 and collar 71 in either direction from the central position will cause angular movement of the rocker arm 90 and shaft 83 in a clockwise direction to close the micro-switch 24.

While the micro-switch 24 is capable of exerting yielding bias on the shaft 83 through the arm 91 thereon tending to rock the shaft in the anti-clockwise direction and thereby maintain the cam follower rollers 94, 96, 101, and 103 engaged with their respective cams, a separate tension spring 105 is preferably provided for that purpose. As shown best in FIGURE 6, one end of the tension spring 105 is attached as at 106 to the outer end of the arm 91, and the other end of the spring is anchored as at 107 to the bracket 33 at the side of the arm 91 remote from the switch.

The truck is provided with a single acting hydraulic ram for raising the fork carriage, lowering of the fork carriage being under gravity, and with three double acting hydraulic rams for manipulating three mechanical devices on the truck, such as for example a device for tilting the mast, a clamping device having jaws movable into engagement with a load on the forks, or a device for turning the fork carriage. Such devices do not form part of the present invention and have not therefore been illustrated in the drawings. It will of course be understood that each device may be operated by a plurality of rams connected in parallel.

The valve spool 14 is connected in a hydraulic circuit between a motor driven pump and the single acting ram for raising the fork carriage. In the upper operative setting of the spool, the outlet of the pump is connected to the ram so that when the pump motor is driven, hydraulic fluid is pumped from a reservoir tank to the ram to raise the fork carriage. In the lower operative setting of the spool 14, the ram is connected by way of the spool valve to the reservoir tank and the weight of the carriage moves the ram piston which in turn causes hydraulic fluid to flow from the ram to the tank.

The valve spool 13 is connected in a hydraulic circuit between the pump and a double acting ram for adjusting the angle of inclination of the mast. In the upper operative setting of the spool 13, the outlet of the pump is connected to one side of the double acting ram whilst the other side is connected to the reservoir tank, the arrangement being such that when the pump motor is driven, hydraulic fluid is fed to the ram and the force exerted by the ram tilts the mast rearwardly away from the vertical. In the lower operative setting of the spool 13, the outlet of the pump is connected to the other side of the double acting ram, the first mentioned side being connected to the reservoir, so that when pump motor is driven the mast is tilted forwardly towards the vertical.

The valve spools 15 and 16 are each connected in a separate hydraulic circuit between the pump and a double acting hydraulic ram for operating a manipulating device on the truck. Each of the spools 15, 16 connects the outlet of the pump to one side of its associated ram when the spool is in its lower operative setting, and connects the outlet of the pump to the other side of its associated ram when the spool is in its upper operative setting.

In the central or "hold" position the spool valves prevent flow therethrough to the rams from the pump and also prevent flow to the reservoir tank from the rams.

The pump is driven by an electric motor connected in a circuit containing a battery and the micro-switch 24. The micro-switch 24 is in series with the motor, so that the motor is energized to drive the pump only when the micro-switch 24 is closed.

The control level 17 controls the operations of raising and lowering of the fork carriage, as well as tilting of the mast, and the other control level 20 controls operation of the two manipulating devices.

Figure 2:
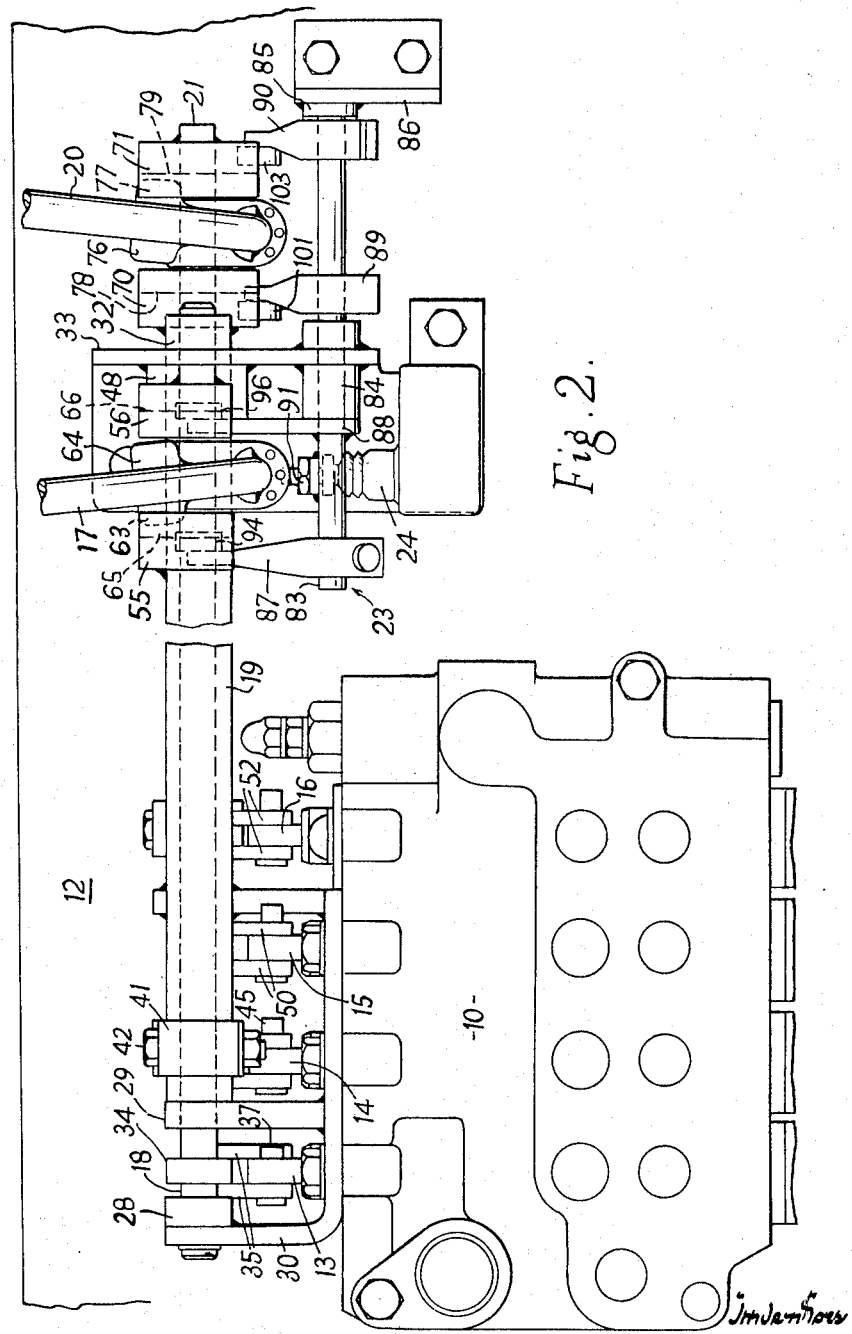
FIGURE 2 is an elevation view of the apparatus of FIGURE 1.

The lever 17, when in the neutral position shown in FIGURE 1, has the tooth 63 engaged in the recess 65 so that the lever is clutched to the collar 55. To raise the fork carriage, the lever 17 is tilted rearwardly into a first operative position, the saddle 57 turning about the shaft 18. This movement of the lever turns the collar 55 and the operating shaft 19 in an anti-clockwise direction, as viewed in the direction of arrow A in FIGURE 1, and thereby raises the valve spool 14 into its upper operative setting in which the outlet of the pump is connected to the single acting ram. This movement of the collar 55 closes the micro-switch 24 (as explained previously) and starts the motor. When the fork carriage has reached the required height, the lever 17, while still clutched to the collar 55, is moved back into its neutral position to isolate the single acting ram from the pump and reservoir and open the micro-switch to de-energize the pump motor.

To lower the fork carriage, the lever 17, while still clutched to the collar 55, is tilted forwards from its neutral position into a second operative position. This movement of the lever turns the collar 55 and operating shaft 19 in a clockwise direction, as viewed in the direction of arrow A in FIGURE 1, and thereby lowers the valve spool 14 into its lower operative setting in which the single acting ram is connected to the reservoir. Clockwise movement of the collar 55 does not result in closure of the micro-switch 24 so that the motor remains de-energized. When the carriage has dropped to the required height, the lever 17, while still clutched to the collar 55 is moved back to its neutral position to isolate the ram from the reservoir.

To tilt the mast, the lever 17, when in the neutral position shown in FIGURE 1 is pivoted towards the collar 56, against the action of the spring 61, so as to engage the tooth 64 in the recess 66 and thereby clutch the lever to the collar 56. The lever 17, while still clutched to the collar 56, may then be moved rearwards into a third operative position and effect angular movement of the collar 56 and shaft 18 in an anti-clockwise direction, as viewed in the direction of arrow A in FIGURE 1, or forwards into a fourth operative position and effect angular movement of the collar 56 and shaft 18 in a clockwise direction. Angular movement of the collar 56 in either direction however closes the micro-switch 24 to energize the pump motor. Thus in the third operative position of the lever the valve spool 13 is in its upper setting and supplies pressure fluid to effect rearward tilt of the mast away from the vertical, and in the fourth operative position of the lever the valve spool 13 is in its lower position and supplies pressure fluid to effect forward tilt of the mast towards the vertical.

The control lever 20 operates in a manner similar to that of the control lever 17, and is adapted to be clutched either to the collar 70 or the collar 71 by pivotal movement of the lever towards the respective collar. When clutched to the collar 71 the lever 20 is movable either forwards or rearwards into a first operative position or a second operative position respectively and when clutched to the collar 70 the lever is movable either forwards or rearwards into a third operative position or a fourth operative position respectively. In the first operative position of the lever 20 the valve spool 15 is in its lower operative setting and in the second position this valve spool is in its upper operative setting. In the third operative position of the lever 20 the valve spool 16 is in its lower operative setting and in the fourth position this valve spool is in upper operative setting. In each of the operative positions of the lever 20, the micro-switch is closed and the pump motor is energized.

In the embodiment of the invention described above, the control apparatus has four valevs independently movable by two levers. The control apparatus may however have only two valves independently movable by a single lever, or three valves two of which are independently movable by one lever and the other of which is controlled by another lever. In these two arrangements, the lever controlling the two valves is movable into a number of operative positions, in each of which the valves are in a different operative setting, and the micro-switch is closed in some but not necessarily all of the operative positions of the lever.

We claim:

1. A hydraulically operated system of the type having a pair of fluid pressure operated motors, a hydraulic pump for supplying pressure fluid to the motors, and an electric motor to drive the pump, said system comprising: a valve body; a pair of valve elements in the body, one for each fluid motor, and each shiftable from a non-operating neutral position to either of two operative positions when moved in opposite directions from its neutral position, each valve element being adapted to control the supply of hydraulic fluid from an electric motor driven pump to its fluid motor; an operating shaft for each valve element, supported for rotary movement about an axis fixed with respect to the valve body; means linking each operating shaft with its valve element and operable to effect movement thereof to its operative positions in response to angular movement of the shaft in opposite directions from a central position; control means operable selectively to move each operating shaft in opposite angular directions from its central position; a normally open switch fixed with respect to the valve body and adapted to control an energizing circuit for an electric pump motor; a switch actuating shaft supported for rotary movement about an axis fixed with respect to the valve body; a switch actuating member on the switch shaft adapted to close the switch in response to angular movement of the switch shaft in one direction from a normal switch open position; a pair of cam followers on the switch shaft; and a cam mounted on each of said operating shafts, said cams being cooperable with the cam followers to effect rotary movement of the switch shaft in said one direction to close the switch in response to movement of either operating shaft in one angular direction from its central position.

2. The system of claim 1, wherein said operating shafts for the valve elements are coaxial; and wherein each of said cams comprises a collar secured on its operating shaft and having a cam surface with which one of said cam followers engages.

3. The system of claim 2, wherein one of said collars has a pair of cam surfaces thereon to effect closing of the switch in consequence of angular motion of its associated operating shaft in either direction from its central position.

4. The system of claim 2, wherein said valve elements are movable back and forth along parallel axes lying in a common plane; wherein said operating shafts comprise an assembly consisting of concentric inner and outer shafts arranged on a common axis normal to said parallel axes and spaced to one side of their common plane, the inner shaft having an end portion projecting a distance beyond the adjacent end of the outer shaft at one end of the assembly; wherein said control means comprises a single control lever; and wherein separate clutch members mounted one on each of the operating shafts at said one of the assembly and at opposite sides of the control lever are selectively engageable by the control lever to drivingly connect the lever with either operating shaft.

5. The system of claim 4, wherein a saddle freely rotatably mounted on the projecting end portion of the inner shaft at a location between the clutch members mounts the control lever for rotary motion about an axis transverse to the common axis of the shaft assembly; and wherein the control lever has means thereon to selectively drivingly engage one or the other of said clutch members depending upon the angular position of the lever on said transverse axis.

6. The system of claim 5, wherein the clutch members comprise said collars and have the cam surfaces formed on their peripheries.

7. The system of claim 5, wherein the control lever is yieldingly torsionally biased to an angular position on said transverse axis at which the lever is drivingly connected with one of the clutch members.

References Cited by the Examiner
UNITED STATES PATENTS

| | | | |
|---|---|---|---|
| 742,967 | 11/1903 | Cardwell | 137—636 X |
| 1,907,208 | 5/1933 | Lebel | 60—52 |
| 2,139,473 | 12/1938 | Sessions | 60—52 X |
| 2,265,260 | 12/1941 | Argo | 137—635 |
| 2,430,597 | 11/1947 | Acton | 60—52 X |
| 2,787,775 | 3/1957 | Fullwood | 137—635 |

JULIUS E. WEST, *Primary Examiner.*